(12) United States Patent
Yamada et al.

(10) Patent No.: US 6,410,189 B1
(45) Date of Patent: Jun. 25, 2002

(54) CURRENT COLLECTORS FOR BATTERY

(75) Inventors: Kazunori Yamada, Atsugi; Toshiaki Watanabe, Yugawara-machi; Shuhel Kubota, Fujieda; Shizuo Sugawara, Tokyo, all of (JP)

(73) Assignee: Tokai Aluminum Fiol Co., Ltd., Yokohama (JP)

( * ) Notice: Subject to any disclaimer, the term of this patent is extended or adjusted under 35 U.S.C. 154(b) by 0 days.

(21) Appl. No.: 09/471,516

(22) Filed: Dec. 23, 1999

(30) Foreign Application Priority Data

Dec. 25, 1998 (JP) ............................ 10-368625
Jun. 1, 1999 (JP) ............................ 11-154194

(51) Int. Cl.[7] .................... H01M 4/64; B23P 13/00
(52) U.S. Cl. .................... 429/233; 429/234; 429/241; 429/242; 429/245; 429/246; 429/254; 429/231.95; 29/623.1; 29/2
(58) Field of Search ................. 429/233, 234, 429/241, 242, 245, 246, 254, 231.95; 29/623.1, 2

(56) References Cited

U.S. PATENT DOCUMENTS

| | | |
|---|---|---|
| 4,999,263 A | 3/1991 | Kabata et al. |
| 5,350,645 A | 9/1994 | Lake et al. |
| 5,434,017 A | 7/1995 | Berkowitz et al. |
| 5,460,904 A | 10/1995 | Gozds et al. |
| 5,641,591 A * | 6/1997 | Kawakami et al. ......... 429/218 |
| 5,700,298 A * | 12/1997 | Shi et al. ................. 29/623.1 |
| 5,786,981 A | 7/1998 | Aoki et al. |

FOREIGN PATENT DOCUMENTS

| | | |
|---|---|---|
| EP | 0 975 038 A2 | 1/2000 |
| JP | 04-147567 | 5/1992 |
| JP | 04-147568 | 5/1992 |
| JP | 5-325952 | 12/1993 |
| JP | 8-250109 | 9/1996 |
| JP | 9-22699 | 1/1997 |
| JP | 9-232195 | 9/1997 |
| JP | 11-87877 | 3/1999 |
| WO | WO 96/13072 | 5/1996 |

* cited by examiner

Primary Examiner—Gabrielle Brouillette
Assistant Examiner—Angela J. Martin
(74) Attorney, Agent, or Firm—Knobbe, Martens, Olson & Bear, LLP

(57) ABSTRACT

This invention provides a polymer rechargeable battery, which is obtained by integrally holding a separator, which comprises a polymer and a plasticizer, between positive and negative electrodes and then replacing the plasticizer with an electrolyte solution. The positive and negative electrodes are provided with current collectors obtained by etching metal-foil base materials, respectively. This invention also provides such current collectors. The polymer rechargeable battery according to this invention is excellent in impedance characteristic, load characteristic and the like.

11 Claims, 5 Drawing Sheets mer battery being produced by forming a composition, which comprises a polymer and a plasticizer, into a film as a separator, assembling the separator, a positive electrode and a negative electrode into a cell and then replacing the plasticizer in the polymer with an electrolyte solution. Another object of the present invention is to provide a current collector extremely suited for use in such a battery.

CURRENT COLLECTORS FOR BATTERY

BACKGROUND OF THE INVENTION a) Field of the Invention

This invention relates to current collectors for a polymer rechargeable battery and also to a fabrication process of the same. More specifically, the present invention is concerned with current collectors having excellent performance for use in a rechargeable battery and also with a fabrication process of the same. The current collectors according to the present invention are useful in a polymer battery obtained by assembling a cell with a separator made of a polymer and a plasticizer and then replacing the plasticizer with an electrolyte solution.

b) Description of the Related Art

A polymer battery is composed of a positive electrode member and a negative electrode member integrally united together with a polymer electrolyte held as a separator therebetween, and the positive and negative electrode members are provided with current collectors, respectively.

Owing to the use of the polymer electrolyte in place of a liquid electrolyte, the polymer battery can be formed with a reduced thickness and also with excellent safety. Such polymer batteries are hence expected to find utility as batteries for small portable electronic equipments.

Polymer electrolytes can be classified into those consisting solely of polymers and electrolyte salts, respectively, and those of the gel type formed in combination of polymers, electrolyte solutions and electrolyte salts, respectively. The polymer electrolytes of the former type are not fully satisfactory in performance as batteries, so that under the circumstances, gel-type polymer batteries are under development for commercialization.

Gel-type polymer electrolytes, however, are accompanied by problems inter alia in that they are inferior in film-forming properties and they require a special environment upon assembling cells because of the problem of hygroscopicity of lithium electrolyte salts.

To solve the above-described problems, U.S. Pat. No. 5,460,904, which is incorporated herein by reference, discloses to produce a polymer battery by forming a composition, which comprises a polymer and a plasticizer, into a film as a separator, assembling the separator, a positive electrode and a negative electrode into a cell, and then replacing the plasticizer in the polymer with an electrolyte solution. Batteries available from this process are, however, still not considered to be equipped with sufficient service performance.

For elements affecting the performance of the above-described polymer batteries, a study was conducted in various ways. As a result, current collectors were found to give considerable influence. Since a plasticizer is replaced with an electrolyte solution subsequent to the assembly of a cell in such a polymer battery, the current collectors must be in the form of meshes defining therein a number of openings through which a solvent and the electrolyte are allowed to move. Conventionally employed as such current collectors are expanded metals produced by such a method as forming slits in a staggered relationship in metal sheets and then stretching the slitted metal sheets. However, these expanded metals have been found that they are insufficient in strength and may not equipped with tensile strength high enough to permit coating or lamination of a positive or negative electrode material. They have hence been found to be unsuited for line production and also to lead to batteries insufficient in performance, for example, in impedance characteristic, the capacity utilization, and the like.

SUMMARY OF THE INVENTION

An object of the present invention is therefore to provide a polymer battery having excellent performance, said polymer battery being produced by forming a composition, which comprises a polymer and a plasticizer, into a film as a separator, assembling the separator, a positive electrode and a negative electrode into a cell and then replacing the plasticizer in the polymer with an electrolyte solution. Another object of the present invention is to provide a current collector extremely suited for use in such a battery.

The above-described objects can be achieved by a current collector for a polymer battery available from assembling a cell with a separator made of a polymer and a plasticizer and then replacing the plasticizer with an electrolyte solution, wherein the collector is available from etching of a metal-foil base material and is provided with a number of openings; and also by a polymer rechargeable battery with such current collectors assembled therein.

The current collector may preferably define therein openings arranged in a honeycomb pattern.

The polymer battery making use of the current collectors according to the present invention, said current collectors having been fabricated by etching, especially the polymer battery making use of the current collectors with openings arranged in a honeycomb pattern are excellent in impedance characteristic and load characteristic. Although reasons for such excellent impedance characteristic and load characteristic have not been fully elucidated, they seem to be attributable to relatively small contact areas and hence, relatively low combined resistances between the respective current collectors and their associated positive electrode film and negative electrode film and also to reduced average current migration lengths within the respective current collectors.

DETAILED DESCRIPTION OF THE INVENTION AND PREFERRED EMBODIMENTS

The polymer rechargeable battery according to the present invention is formed as an integral unit with a separator being held between positive and negative electrodes composed of current collectors and positive and negative electrode materials, respectively. The separator is obtained by assembling a film, which is made of a polymer and a plasticizer, into a cell and then replacing the plasticizer with an electrolyte solution.

Examples of the polymer for use in the separator can include homopolymers and copolymers of ethylene oxide, acrylonitrile, and fluorinated vinylidene. As the plasticizer, those conventionally employed as plasticizers for plastics, such as dibutyl phthalate, diethyl phthalate, dioctyl phthalate, tributoxyethyl phosphate and tricresyl phosphate, are all usable. The plasticizer imparts film-forming properties to the polymer and, after the cell is assembled, is replaced with the electrolyte solution to facilitate absorption of the electrolyte solution into the polymer. A solvent, such as acetone, methylethylketone or tetrahydrofuran, may also be used as needed, for example, for the regulation of a viscosity. The polymer, the plasticizer and other optional components such as a solvent are combined into an intimate mixture by a method known per se in the art, followed by the formation into a film. For example, the film can be obtained by mixed the above components in a blender, evenly coating the resulting mixture onto a plastic-made release film by a doctor blade, drying the coated mixture to remove the solvent, and then peeling off the resultant film.

As the positive electrode material, one obtained by mixing an active material usable in conventional lithium-ion rechargeable batteries, for example, a lithium salt such as $LiCoO_2$, $LiNiO_2$ or $LiMn_2O_4$ with a polymer, a plasticizer and if necessary, a solvent and the like, all of which are similar to those employed in the separator, and then forming the resultant mixture into a film can be used. As the negative electrode material, one obtained by mixing an active material usable in the conventional lithium-ion rechargeable batteries, for example, graphite with a polymer, a plasticizer and if necessary, a solvent and the like, all of which are similar to those employed in the separator, and then forming the resultant mixture into a film can be used. These film-forming steps can be conducted by a similar method as that employed for the separator. The polymer and plasticizer for the positive electrode material and the polymer and plasticizer for the negative electrode material may desirably be of the same types as the polymer and plasticizer for the separator from the practical viewpoint, by may be of different types from the polymer and plasticizer for the separator.

Figure 1:
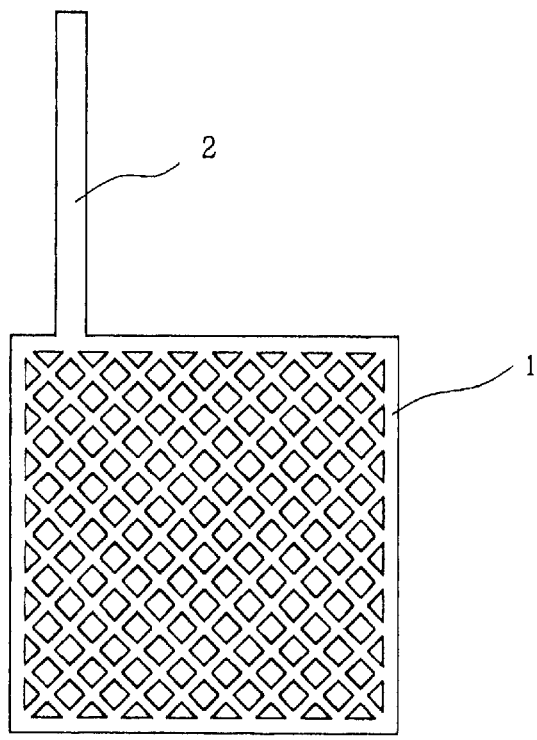
FIG. 1 is a plan view of a current collector according to a preferred embodiment of the present invention, which is provided with a lead.

A current collector for use in the present invention is provided with a number of openings. With reference to FIG. 1, the current collector with the lead, said current collector pertaining to the preferred embodiment of the present invention, will be described. In FIG. 1, numeral 1 indicates a current collector main body, and numeral 2 designates a lead.

The current collector according to the present invention is fabricated by etching. As a base material, an aluminum foil is generally used in the case of a positive electrode or a copper foil is generally used in the case of a negative electrode. No particular limitation is imposed on the thickness of the metal-foil base material insofar as the thickness permits use of the metal-foil base material as a current collector. In general, however, the thickness may range from 5 to 100 μm, preferably from 20 to 100 μm, more preferably from 20 to 50 μm.

As a fabrication process, the following process may be mentioned by way of example.

Figure 2:
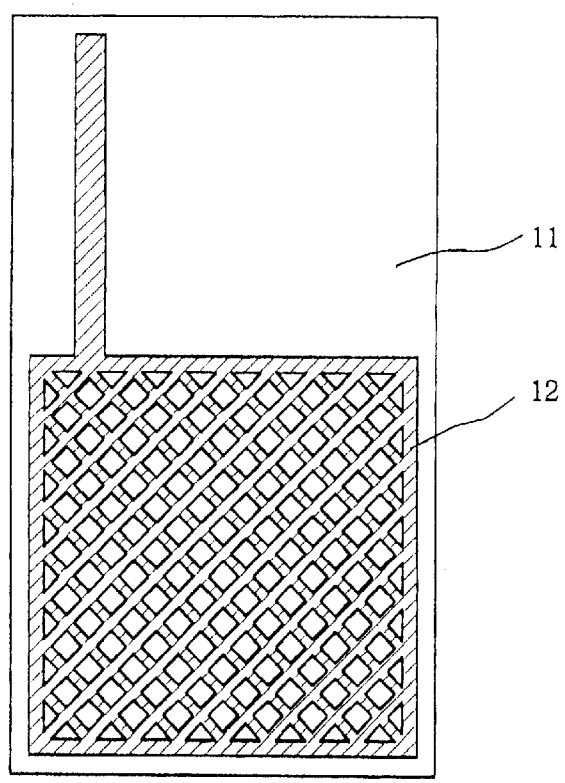
FIG. 2 is a plan view of a metal-foil base plate, which has been masked with an etching resist in the pattern of the current collector with the lead.
Figure 3:
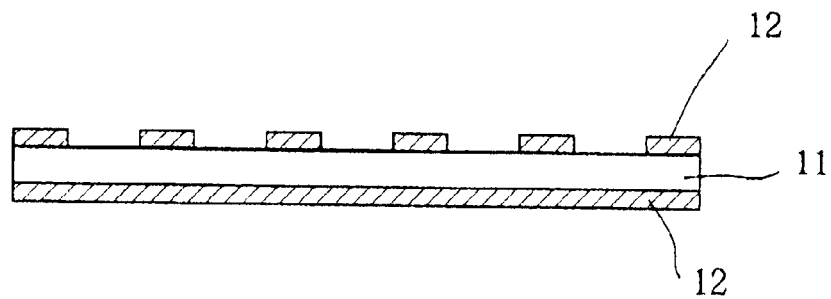
FIG. 3 is a schematic view of the metal-foil base plate of FIG. 2.

As is illustrated in FIG. 2 and FIG. 3, one side of a metal-foil base material 11 is masked over the entire surface thereof with an etching resist 12, and the other side of the metal-foil base material 11 is masked with the etching resist in the form of the collector main body with the lead. After the etching resist 12 is hardened with heat, ultraviolet rays, an electron beam or the like, the metal-foil base material is treated with an etchant to dissolve the metal at unmasked areas. The etching resist is then eliminated with a remover, whereby a current collector is fabricated.

Figure 4:
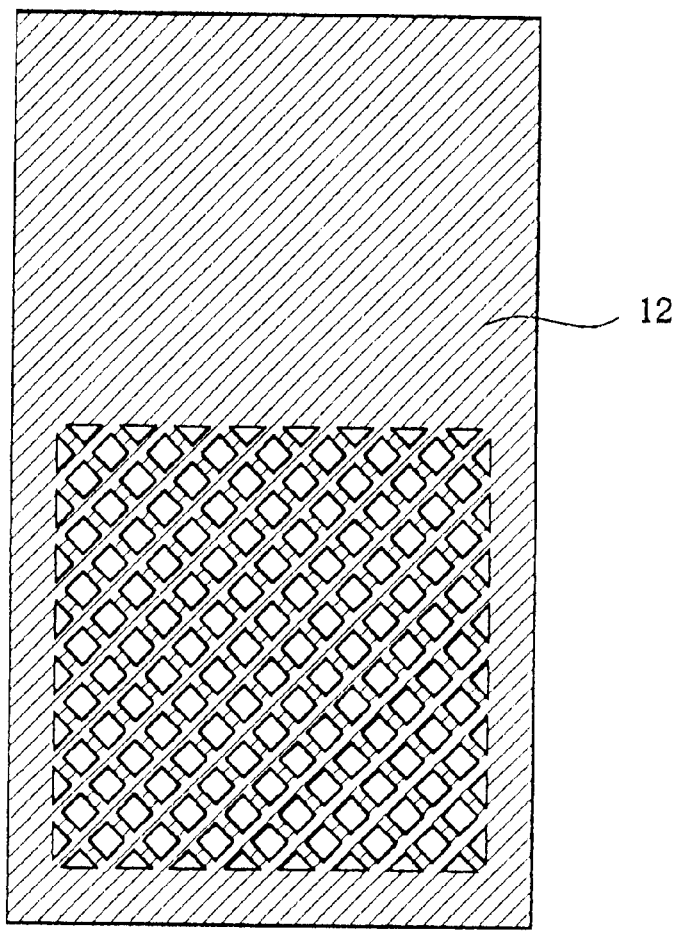
FIG. 4 is a plan view of a metal-foil base plate, which has been masked with an etching resist over the entire surface thereof except for openings in a network pattern.

As an alternative process, as is shown in FIG. 4, one side of a metal-foil base material is masked over the entire surface thereof with an etching resist, and the other side of the metal-foil base material is masked with the etching resist over the entire surface thereof except for openings of a network pattern. By similar methods as in the above, hardening of the etching resist, etching and elimination of the etching resist are conducted. Finally, the metal-foil base material is cut into the contour of the lead-equipped current collector.

As a further alternative process, it is also possible to use a laminate, which is formed of a metal-foil base material and a film or sheet of a material having resistance to the etchant such as a polyester, polyethylene or polypropylene, instead of masking the one side of the metal-foil base material at the entire surface thereof with the etching resist. After etching, the film or sheet may be peeled off as needed.

As the etching resist for use in the present invention, any etching resist can be used insofar as it permits masking in a desired pattern and has resistance to the etchant. Typically, various etching resists and dry films employed in the fabrication of printed boards can be used. As etching resist inks, those having heat hardenability or ultraviolet hardenability are often used. Masking with an etching resist ink can be performed by screen printing. For example, one side of a metal-foil base material is screen-printed over the entire surface thereof and subsequent to drying, the other side is screen-printed in a desired pattern. The etching resist ink is then treated by heat, ultraviolet rays or the like depending on the properties of the ink, whereby the ink is hardened. The printing of the other side is unnecessary when a laminate formed of a metal-foil base material and a resin film or sheet is used.

In the case of dry films, they are brought into close contact with both sides of a metal-foil base material. A masking film with a desired pattern drawn thereon is brought into close contact with one side, followed by the exposure to light such as ultraviolet rays. As a result, the dry film on one side is hardened over the entire area thereof, while the dry film on the other side is hardened in the pattern. Latent images are then developed with a weak alkaline solution or the like, so that the one side of the metal-foil base material can be masked over the entire surface thereof and the other side can be masked in the desired pattern. The above-described etching resist inks and dry films are typical examples, and needless to say, the etching resist for use in the present invention shall not be limited to them.

Any etchant can be used insofar as it dissolves the metal but does not dissolve the etching resist. Usable examples can include solutions of ferric chloride and cupric chloride, and acidic solutions such as hydrochloric acid and sulfuric acid. In the case of aluminum-foil base materials, alkaline solutions such as a solution of caustic soda can be used provided that the etching resist is resistant to alkalinity.

Subsequent to the etching, the remaining resist ink is eliminated by a remover or the like. Its elimination can be achieved by using a remover suited for the etching resist, and an alkaline solution such as a solution of caustic soda is often used. When a laminate formed of a metal foil and a film, sheet or the like is used as a base material, the film, sheet or the like may be peeled off as needed. The current collector according to the present invention can be fabricated as described above.

Figure 5:
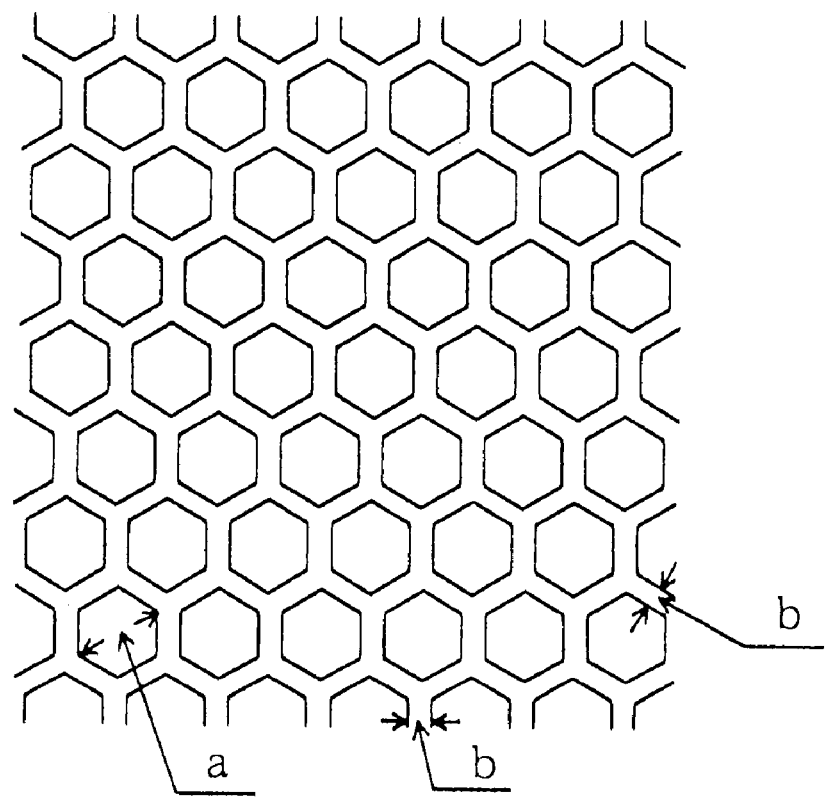
FIG. 5 is a fragmentary plan view showing the construction of a current collector with openings arranged in a honeycomb pattern.

The current collector according to the present invention defines a number of openings therein. These openings may have a substantially regular hexagonal shape so that they may be arranged in a honeycomb pattern. Use of such current collectors has been found to provide a battery with improved impedance characteristic and also with improved capacity utilization. In this case, the openings arranged in the honeycomb pattern through the respective current collectors are formed at areas where the current collectors are to be maintained in contact with the positive electrode film and the negative electrode film, respectively, and no openings are formed in the respective leads. The average diameter of these openings may range preferably from 0.1 to 5 mm, more preferably from 0.5 to 2 mm. The term "the diameter of an opening" as used herein means the distance (a in FIG. 5) between opposing vertices of a regular hexagon. The term "the average diameter" means an arithmetic average diameter of numerous openings in a current collector. It is however to be noted that in the case of openings arranged in a honeycomb pattern, the openings have substantially the same size and the average diameter is practically equal to the diameter of each opening. Further, the width (b in FIG. 5) between adjacent sides of neighboring openings is substantially the same irrespective of the locations of the neighboring openings as all the openings are arranged in the honeycomb pattern, and may range preferably from 0.1 to 5 mm, more preferably from 0.5 to 2 mm. Further, the current collectors fabricated as described above have a thickness preferably in a range of from 5 to 100 $\mu$m, with a range of from 20 to 50 $\mu$m being more preferred.

The polymer battery according to the present invention can be produced as will be described next.

The above-described positive and negative electrode materials, both of which have been formed into sheet-like configurations, are integrated with the positive and negative electrode current collectors, respectively, whereby positive and negative electrodes are formed. The integration can be achieved, for example, by thermolamination. As an alternative, mixtures—which contain positive and negative electrode materials, respectively—may be coated directly onto the current collectors, respectively, and are then dried. No limitation is therefore imposed on the manner of integration.

The separator film is placed between the thus-produced positive and negative electrodes, and these components are integrated into a laminate. This integration can be performed, for example, by thermolamination. The laminate so obtained is next immersed in an extracting solvent for the plasticizer such that the plasticizer is extracted partially or wholly, preferably wholly. Preferred as the solvent is a low boiling point solvent which is compatible with the plasticizer and is also inert to the polymer. Illustrative of such a solvent are methanol, diethyl ether, hexane and cyclohexane. Subsequent to the extraction, the solvent is removed by causing it to evaporate to dryness.

The laminate is next immersed in an electrolyte solution. The electrolyte solution is a solution of a supporting electrolyte in a solvent of high electric constant, and electrolyte solutions usable in conventional lithium-ion rechargeable batteries are usable. Examples of the solvent can include propylene carbonate, ethylene carbonate, dimethyl carbonate, dimethyl sulfoxide, γ-butyllactone, sulfolane, 1,2-dimethoxyethane, tetrahydrofuran, dioxolane, and diethyl carbonate. These solvents can be used either singly or in combination. Examples of the electrolyte can include $LiCF_3SO_3$, $LiAsF_6$, $LiBF_4$, $LiClO_4$, and $LiPF_6$. These electrolytes can also be used either singly or in combination. The concentration of the electrolyte may range generally from 0.5 to 5 M. The plasticizer in the laminate is replaced partly or wholly, preferably wholly with the electrolyte solution as described above.

The laminate is then sealed except for the leads of the positive and negative electrodes, whereby a polymer battery is obtained.

The present invention will hereinafter be described by Examples.

EXAMPLE 1

An alkali-soluble etching resist was applied by screen printing over the entire surface of one side of a 50-$\mu$m thick aluminum foil, and was dried at 120° C. for 2 minutes. The other side was then printed with the same etching resist as illustrated in FIG. 2, followed by drying at 120° C. for 20 minutes. The thus-printed aluminum foil was next treated with an etchant (ferric chloride), whereby aluminum was leached out at areas not printed with the etching resist. Subsequent to washing, the etching resist was treated and removed with an alkaline solution, and a current collector similar to one illustrated in FIG. 1 was obtained.

EXAMPLE 2

Using 40-$\mu$m thick aluminum foils, etching was conducted in a similar manner as in Example 1, whereby 15 mm×200 mm specimens were prepared, one defining therein regular hexagonal openings arranged in a honeycomb pattern and the other being provided with oval openings. Those specimens were tested for tensile strength and yield strength. As a comparison, similar measurements were conducted with respect to a 60-$\mu$m thick expanded metal of the same shape and dimensions.

The results are presented in Table 1. It can be said from the table that a current collector according to the present invention, which defines therein openings arranged in a honeycomb pattern, can withstand tensile force about 10 times as much as an expanded metal.

TABLE 1

|  | Shape of openings | Line width (mm) | Rate of opening areas (%) | Tensile strength (kg/mm²) MD* | Tensile strength (kg/mm²) CD** | Yield strength (kg/mm²) MD* | Yield strength (kg/mm²) CD** |
|---|---|---|---|---|---|---|---|
| Etched foil | Regular hexagonal (honeycomb-patterned) | 0.2 | 60 | 2.4 | 2.9 | 2.0 | 2.3 |
| Etched foil | Oval | 0.2 | 50 | 0.6 | 3.7 | 0.4 | 3.3 |
| Expanded foil | Rhombic | 0.15 | 70 | 0.3 | 1.9 | 0.2 | 1.1 |

*MD: Machine direction
**CD: Cross direction

EXAMPLE 3

(1) Fabrication of Honeycomb-shaped Current Collectors

A laminate film formed of a 20-μm thick aluminum foil and a 50-μm thick polyester film was coated on the surface of the aluminum foil with an etching resist. The thus-coated laminate film was then treated in a similar manner as in Example 1, whereby an aluminum foil equipped with a lead and defining therein regular hexagonal openings arranged in a honeycomb pattern was fabricated as a current collector for positive electrode. All the regular hexagonal openings had a diameter of 1.0 mm, and the adjacent sides of the neighboring regular hexagonal openings were all apart from each other at a width of 0.3 mm.

Using another laminate film formed of a 20-μm thick copper foil and a 50-μm thick polyester film, a current collector of a similar shape for negative electrode was also fabricated likewise.

(2) Fabrication of Positive Electrode

Mixed for 10 minutes in a blender (4,000 rpm) were 110 g of acetone as a solvent and 100 g of a raw material which consisted of $LiCoO_2$, "Ensaco 250" (trade name for conductive carbon, product of MMM Carbon), "KYNAR2801" (trade name for a vinylidene fluoride-hexafluoropropylene copolymer, product of Elf Atochem Japan) and dibutyl phthalate at a weight ratio of 70/5/8/17. The resulting mixture was coated to a uniform thickness by a doctor blade and the acetone was caused to evaporate to dryness, whereby a positive electrode film of 130 μm in thickness was fabricated. The aluminum current collector fabricated in the above and the positive electrode film were then thermolaminated together at about 120° C. into a positive electrode.

(3) Fabrication of Negative Electrode

A mesophase carbon material ("MCMB25-28", trade name; product of Osaka Gas Co., Ltd.), which is widely used as a negative electrode material in lithium batteries, was used. Mixed in a blender were 200 g of acetone as a solvent and 100 g of a raw material which consisted of "MCMB25-28", "Ensaco250" (conductive carbon), "KYNAR2801" and dibutylphthalate at a weight ratio of 69.4/2.2/8.6/19.8. The resulting mixture was coated to a uniform thickness by a doctor blade and the acetone was caused to evaporate to dryness, whereby a negative electrode film of 150 μm in thickness was fabricated. The copper current collector fabricated in the above and the negative electrode film were then thermolaminated together at about 120° C. into a negative electrode.

(4) Fabrication of Separator

Mixed in a blender were 225 g of acetone and 100 g of a raw material which consisted of $SiO_2$, "KYNAR2801" and dibutyl phthalate at a weight ratio of 22/33/44. The resulting mixture was coated to a uniform thickness by a doctor blade and the acetone was caused to evaporate to dryness, whereby a separator of 70 μm in thickness was fabricated.

(5) Assembling of Cell

The above-fabricated three types of films were thermolaminated at 130° C. into an integral unit. The work so obtained was immersed in methanol to extract dibutylphthalate as a plasticizer. The work was then allowed to absorb an electrolyte solution (a 1 M solution of $LiPF_6$ in a 2:1 mixed solvent of ethylene carbonate and dimethyl carbonate). The work was placed in an air-tight bag and was then sealed with the positive and negative leads extending out of the bag, whereby a battery cell was obtained.

Comparative Example 1

A battery cell was produced in a similar manner as in Example 3 except that an expanded metal of aluminum and an expanded metal of copper were used as a current collector for positive electrode and as a current collector for negative electrode, respectively.

Evaluation Test 1

Figure 6:
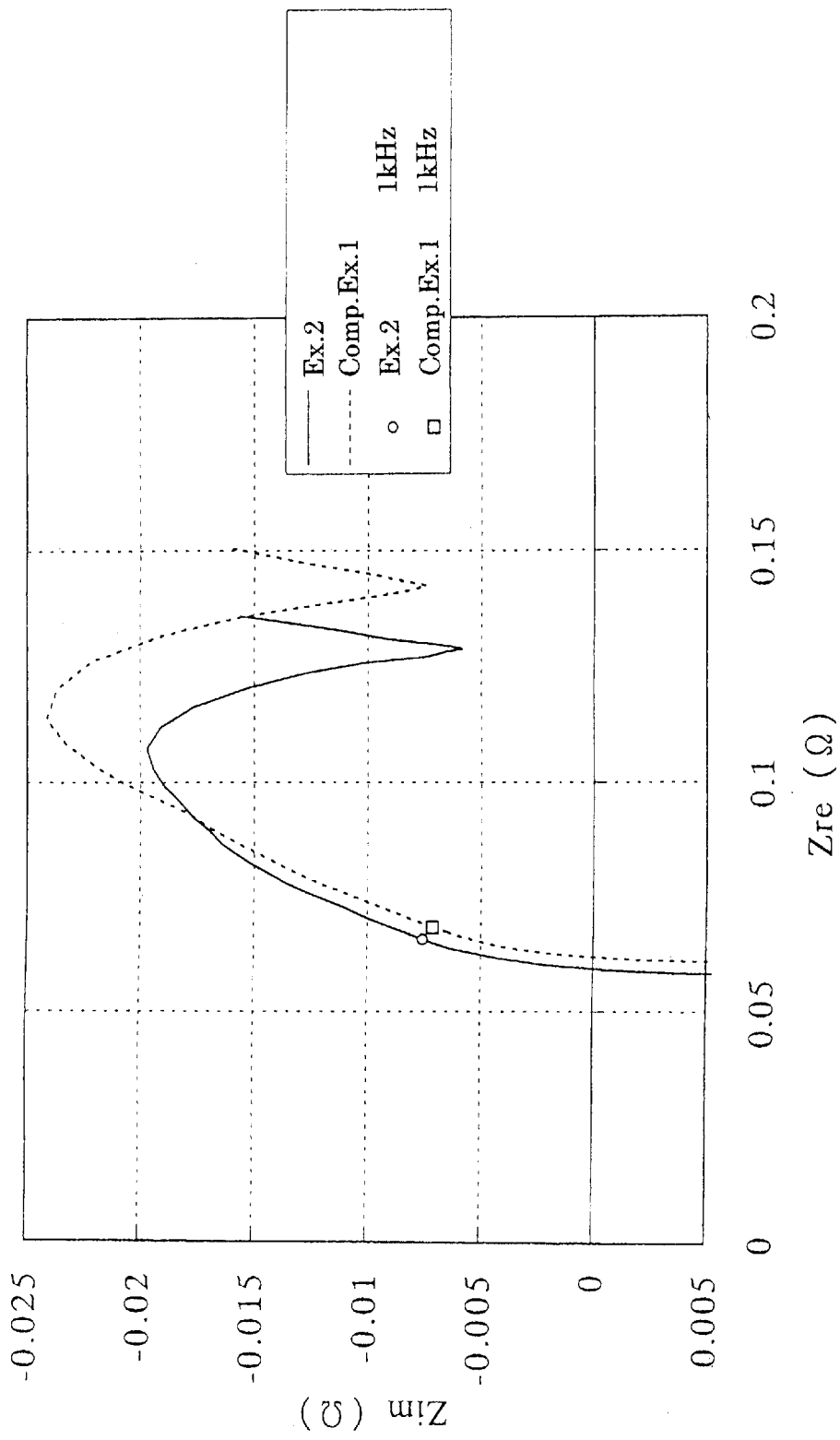
FIG. 6 is an impedance characteristic diagram.

The two types of cells produced as described above were measured for impedance characteristic while varying the frequency by an impedance analyzer. The results are shown in FIG. 6. It is understood from FIG. 6 that compared with the battery cell of Comparative Example 1, the battery cell of Example 2 was lower in impedance and was superior in initial impedance characteristic.

Figure 7:
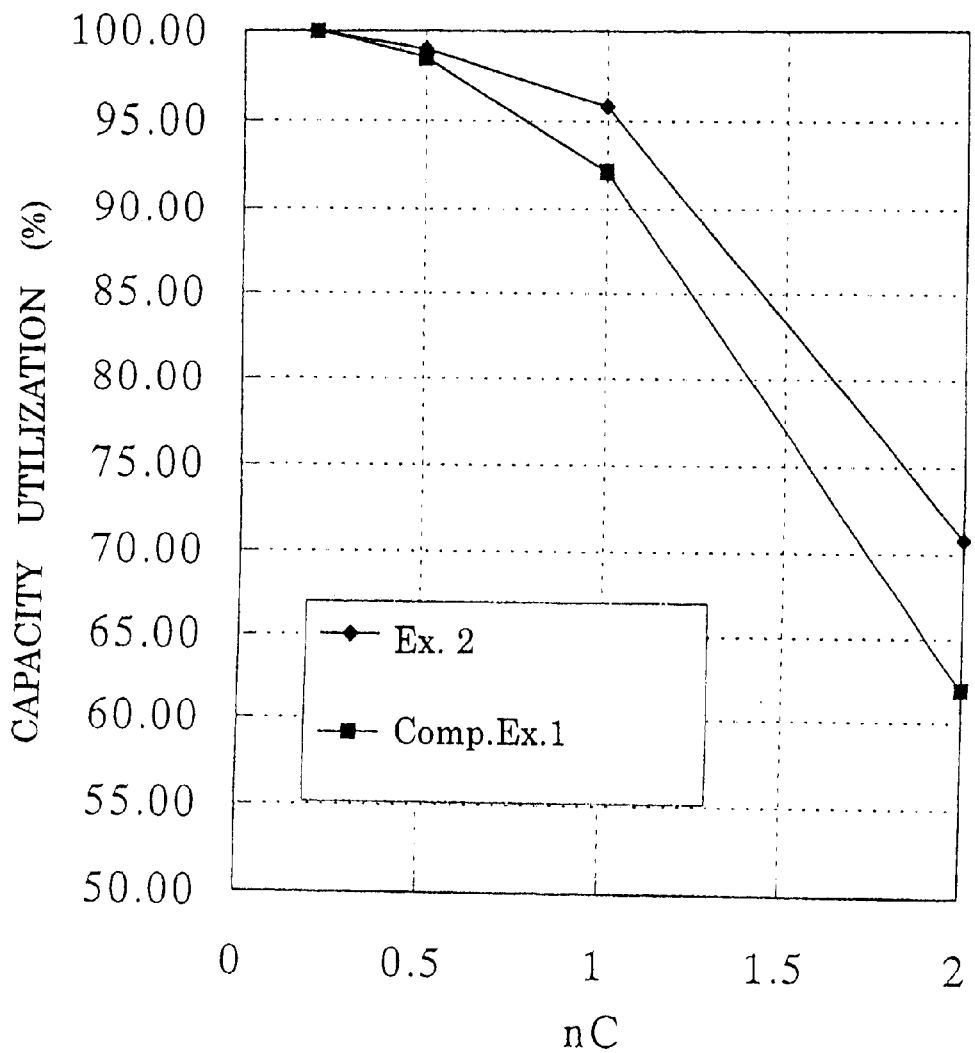
FIG. 7 is a load characteristic diagram.

Further, their load characteristics were also measured by a charge and discharge tester. The results are shown in FIG. 7. It is appreciated from FIG. 7 that compared with the battery cell of Comparative Example 1, the battery cell of Example 2 was superior in the capacity utilization at higher discharge rates.

This application claims the priority of Japanese Patent Application No. 154194/1999 filed Jun. 1, 1999 and that of Japanese Patent Application No. 368625/1998 filed Dec. 25, 1998, both of which are incorporated herein by reference.

What is claimed is:

1. A polymer rechargeable battery comprising:

a current collector for a positive electrode, said current collector being a metal-foil base material and having a number of throughholes formed by etching, wherein the remaining portion is not etched;

a current collector for a negative electrode, said current collector being a metal-foil base material and having a number of throughholes formed by etching, wherein the remaining portion is not etched;

a positive electrode material laminated on the current collector for a positive electrode;

a negative electrode material laminated on the current collector for a negative electrode; and a separator made of a polymer containing an electrolyte solution, said separator being obtained by replacing a plastisizer contained in said polymer with an electrolyte solution, said separator being sandwiched by said positive electrode material and said negative electrode material.

2. A polymer rechargeable battery according to claim 1, further comprising a lead for each current collector, said current collector and said lead having been formed as an integral unit with said metal-foil base material.

3. A polymer rechargeable battery according to claim 1, wherein said throughholes are arranged in a honeycomb pattern.

4. A polymer rechargeable battery according to claim 1, wherein said metal-foil base material is an aluminum-foil base material or a copper-foil base material.

5. A method for fabrication of a polymer rechargeable battery, which comprises:

obtaining a current collector for a positive electrode by etching a metal-foil base material to form a number of throughholes;

integrating said current collector with a positive electrode material comprising a first polymer, a first plasticizer and a positive electrode active material, to form a positive electrode;

obtaining a current collector for a negative electrode by etching a metal-foil base material to form a number of throughholes;

integrating said current collector with a negative electrode material comprising a second polymer, a second plasticizer and a negative electrode active material, to form a negative electrode;

integrally supporting a separator, which comprises a third polymer and a third plasticizer, between said positive electrode material and said negative electrode material; and replacing said first, second and third plasticizers with an electrolyte solution.

6. A polymer rechargeable battery according to claim 1, wherein each electrode material is made of a polymer containing the electrolyte solution and obtained by replacing a plastisizer contained in each electrode material with the electrolyte solution.

7. A method according to claim 5, wherein the throughholes of each current collector are formed in honeycomb patterns.

8. A current collector adapted to be used in the rechargeable battery of claim 1, which is a metal-foil base material and has a number of throughholes formed by etching, wherein the remaining portion is not etched, said current collector having a thickness of 5–100 $\mu$m, said throughholes having a shape such that impedance characteristics and capacity utilization of the rechargeable battery are improved.

9. A current collector according to claim 8, wherein the thickness is in the range of 20–50 $\mu$m.

10. A current collector according to claim 8, which is adapted to contact a positive electrode and is composed of an aluminum foil.

11. A current collector according to claim 8, which is adapted to contact a negative electrode and is composed of a copper foil.

* * * * *